Oct. 27, 1936.  R. R. HUNT  2,058,880

EMBOSSING APPARATUS

Filed March 29, 1933  7 Sheets-Sheet 1

Inventor:
Ray R. Hunt
By Eugene M. Giles
Atty.

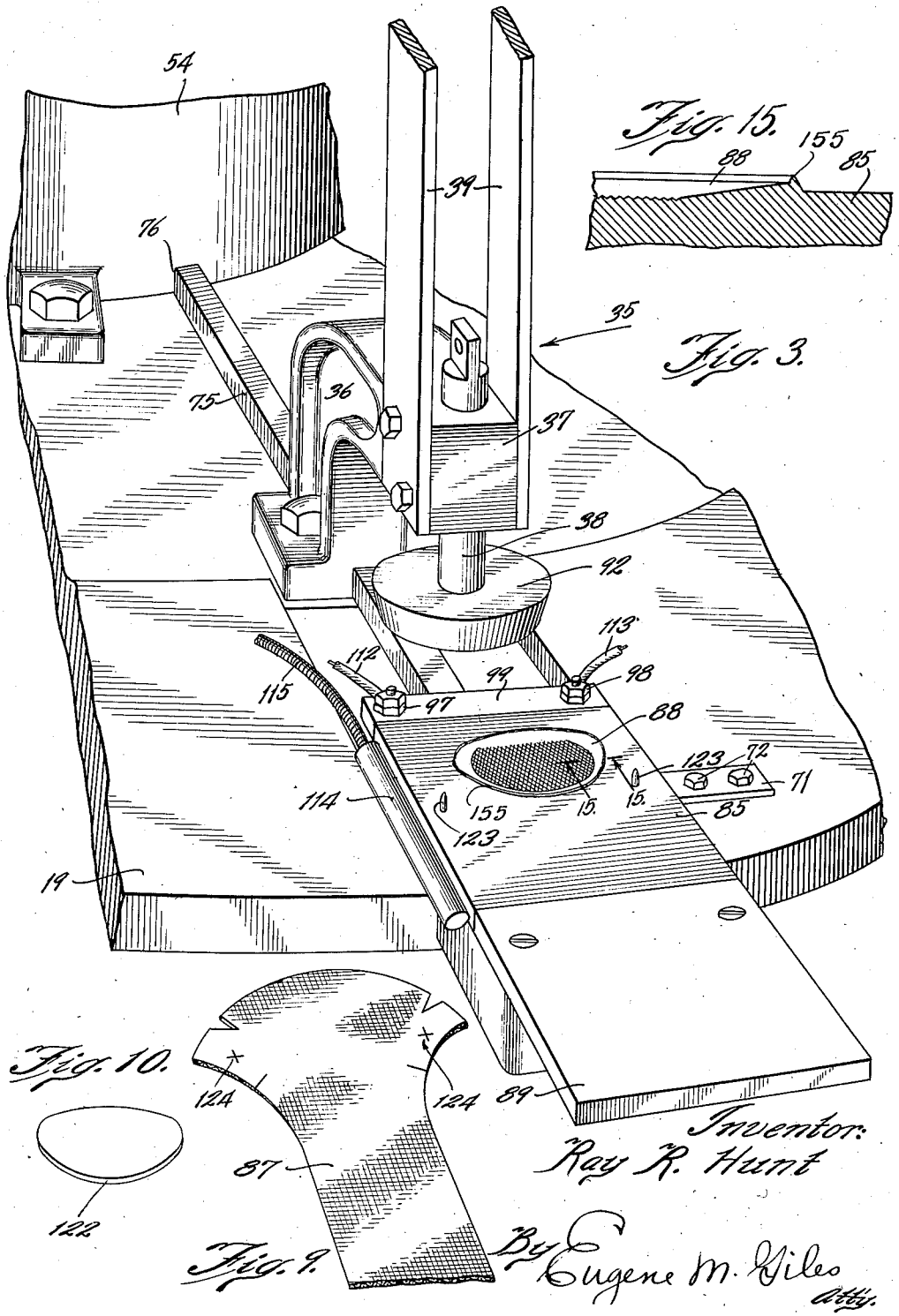

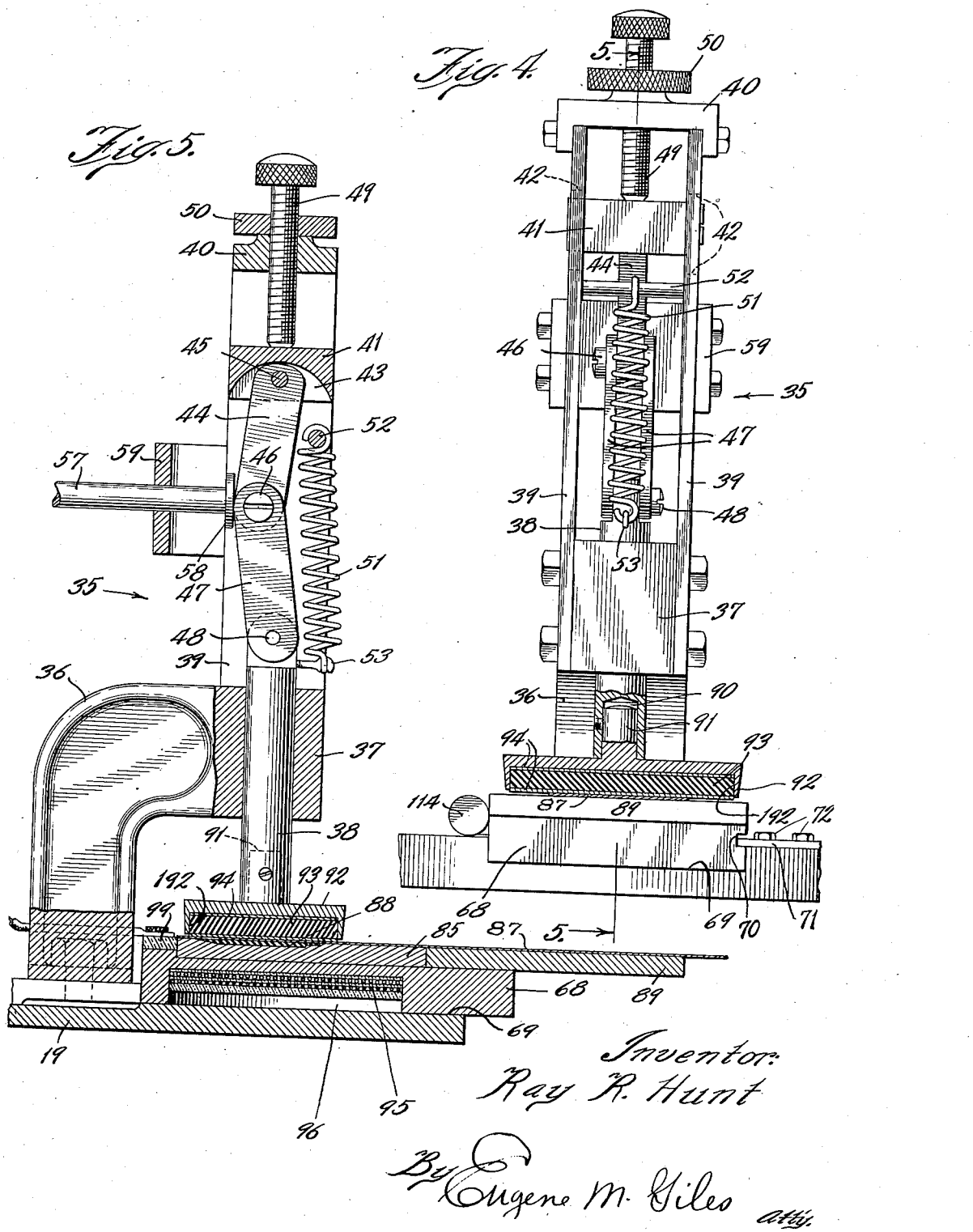

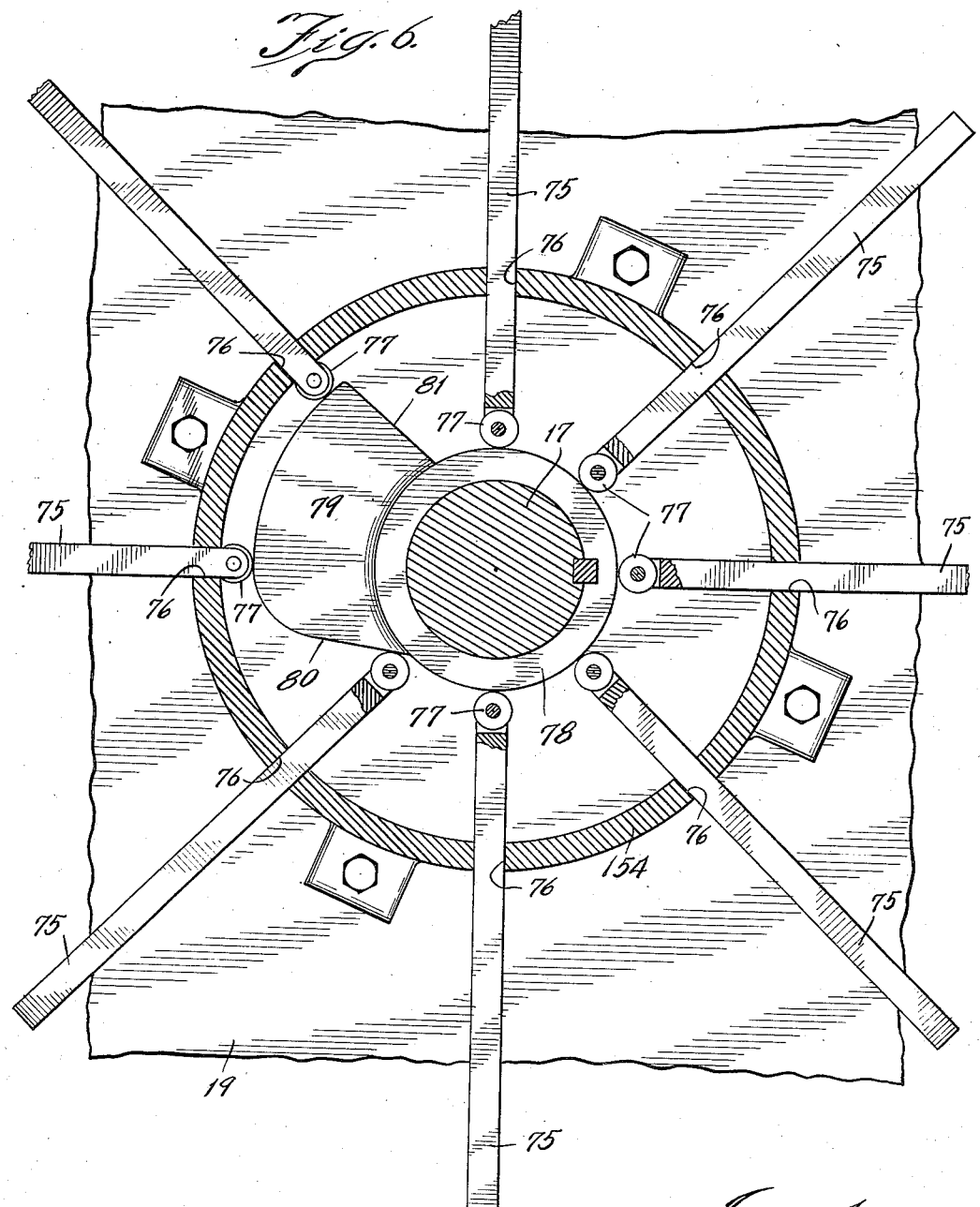

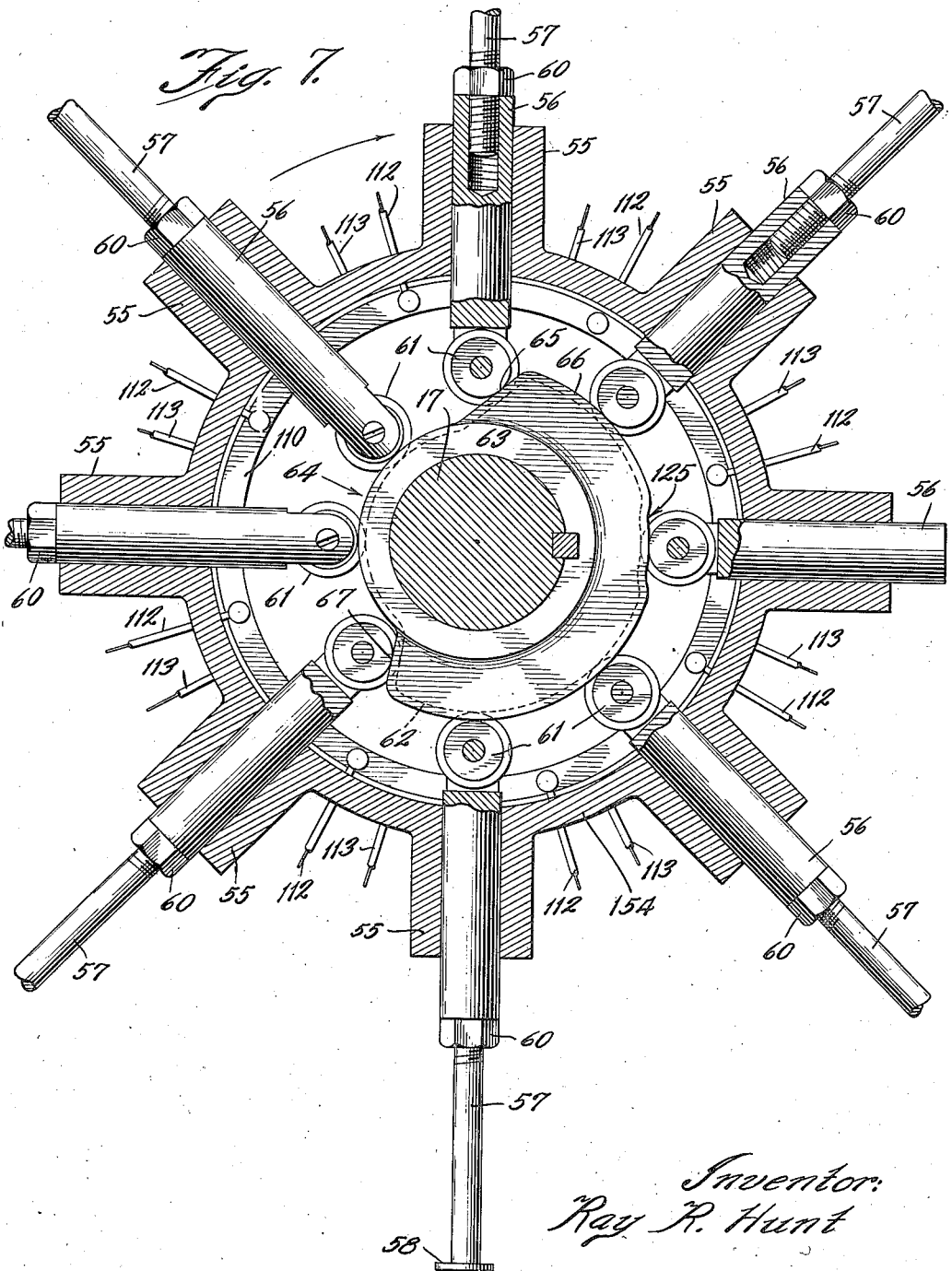

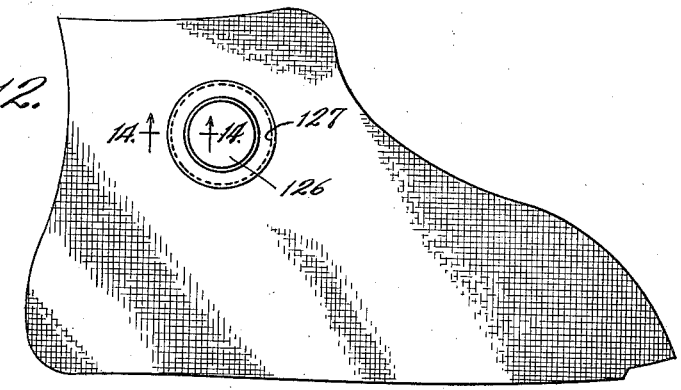
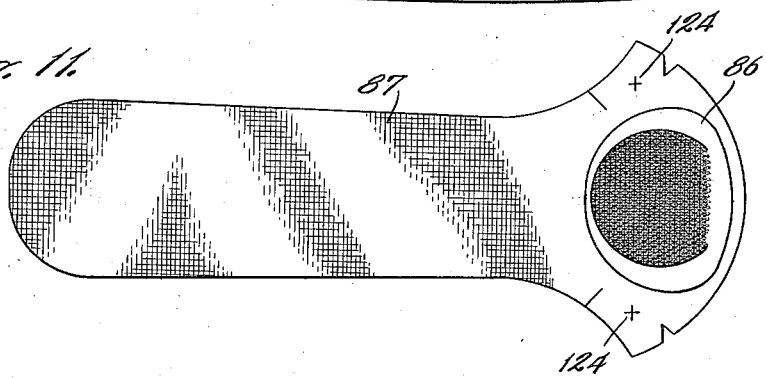
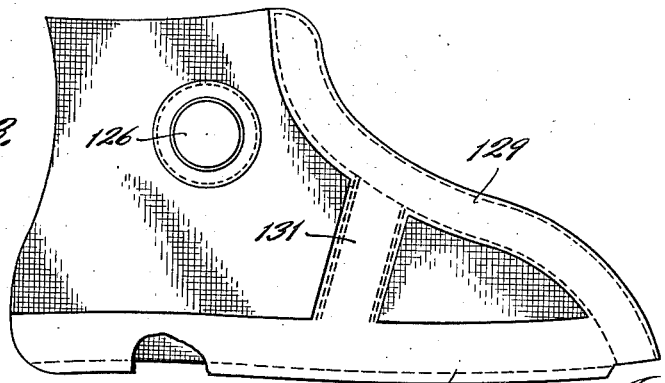

Patented Oct. 27, 1936

2,058,880

UNITED STATES PATENT OFFICE 2,058,880

EMBOSSING APPARATUS

Ray R. Hunt, Mishawaka, Ind., assignor to Mishawaka Rubber and Woolen Manufacturing Company, Mishawaka, Ind., a corporation of Indiana Application March 29, 1933, Serial No. 663,325

3 Claims. (Cl. 18—20)

My invention relates to articles that are made of fabric or like materials with selected areas reinforced or ornamented by a patch like rubber covering or piece of sheet rubber of suitable configuration embossed on the fabric or other material at the selected area, my invention having reference more particularly to an improved method of and apparatus for providing such articles with these ornamental or reinforcing pieces or patches of rubber and also to the product.

In the manufacture of many articles of fabric or the like, it is a common practice to secure small pieces or strips of material to selected areas of the fabric for reinforcing, trimming or for other purpose. For example, in athletic shoes in connection with which my invention is particularly useful, circular pieces or ankle patches are usually secured on the fabric sides or quarters of the shoes and a toe cap on the end of the tongue. It is also customary to secure stay strips along the front edges of the quarters to reinforce same where the lacing eyelets are attached, and saddle strips are sometimes employed which extend downwardly at each side of the instep from the respective lacing stay to a foxing strip which is usually provided along the lower edge of the shoe upper.

Such pieces or strips, which because of their application on a limited or selected portion of the area of the article are similar to and designated herein as patches, have been made of various materials depending somewhat on the nature of the article and the location and purpose of the particular patch. For example, leather has been employed or fabric coated with rubber to simulate somewhat the appearance of leather and such pieces have usually been stitched in place, which however is not entirely satisfactory not only because of the work involved in properly locating and stitching the pieces in place, but also because the stitches oftentimes come loose. Rubber also has been used, particularly in cases where it is desired to have a design or pattern impressed on the patch, but the use of rubber has been objectionable as it has been necessary to cement the rubber in place and it is difficult to limit the cement to the area that is to be covered by the patch and to press the parts into firm adhering relation without damaging the exposed surface of the patch.

With my invention the provision of patches of this character on articles is greatly simplified and facilitated and a satisfactory and permanent attachment insured,—a vulcanizable rubber compound being employed which is stamped or pressed onto the fabric part, preferably before the latter is assembled into the completed article, the rubber being vulcanized under pressure directly onto the said part so that it becomes firmly bonded to and united with the fabric without any cement or adhesive and the rubber may at the same time be formed on its exposed face with an embossed pattern or design and provided with markings to simulate stitching if desired, so that the patch will have the appearance of being stitched in place.

The principal objects of my invention are to provide an improved patch and method of attaching same to fabric and like materials; to afford a secure and permanent attachment of the patch without the necessity of employing cement, stitching or other special fastening facilities; to insure accurate location of the patch at the proper place on the fabric or other material to which it is attached; to permit convenient formation of the patch with stitch markings or other design on the exposed surface if desired; to provide improved equipment whereby patches may be readily and quickly applied to the fabric or other material; and in general to simplify, facilitate and insure secure and permanent attachment of reinforcing, ornamenting and other patch like members to fabric and similar materials and produce a superior product,—these and other objects being attained by my invention as explained more fully hereinafter and illustrated in the accompanying drawings in which,—

Fig. 3 is an enlarged perspective view of part of one of the press units for vulcanizing toe caps or patches onto shoe tongues;

Fig. 4 is a front view of one of said press units with parts broken away to disclose details of the construction;

Fig. 5 is a view looking at the side of one of the press units with some parts thereof shown in section on the line 5—5 of Fig. 4.

Fig. 6 is an enlarged fragmentary sectional view on the line 6—6 of Fig. 2 showing the cam mechanism for operating the slides upon which the work is placed;

Fig. 7 is a similar view on the line 7—7 of Fig. 2 showing the cam mechanism for operating the presses;

Figure 8:
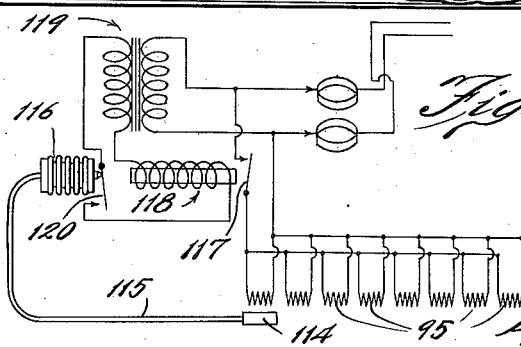
Figure 2:
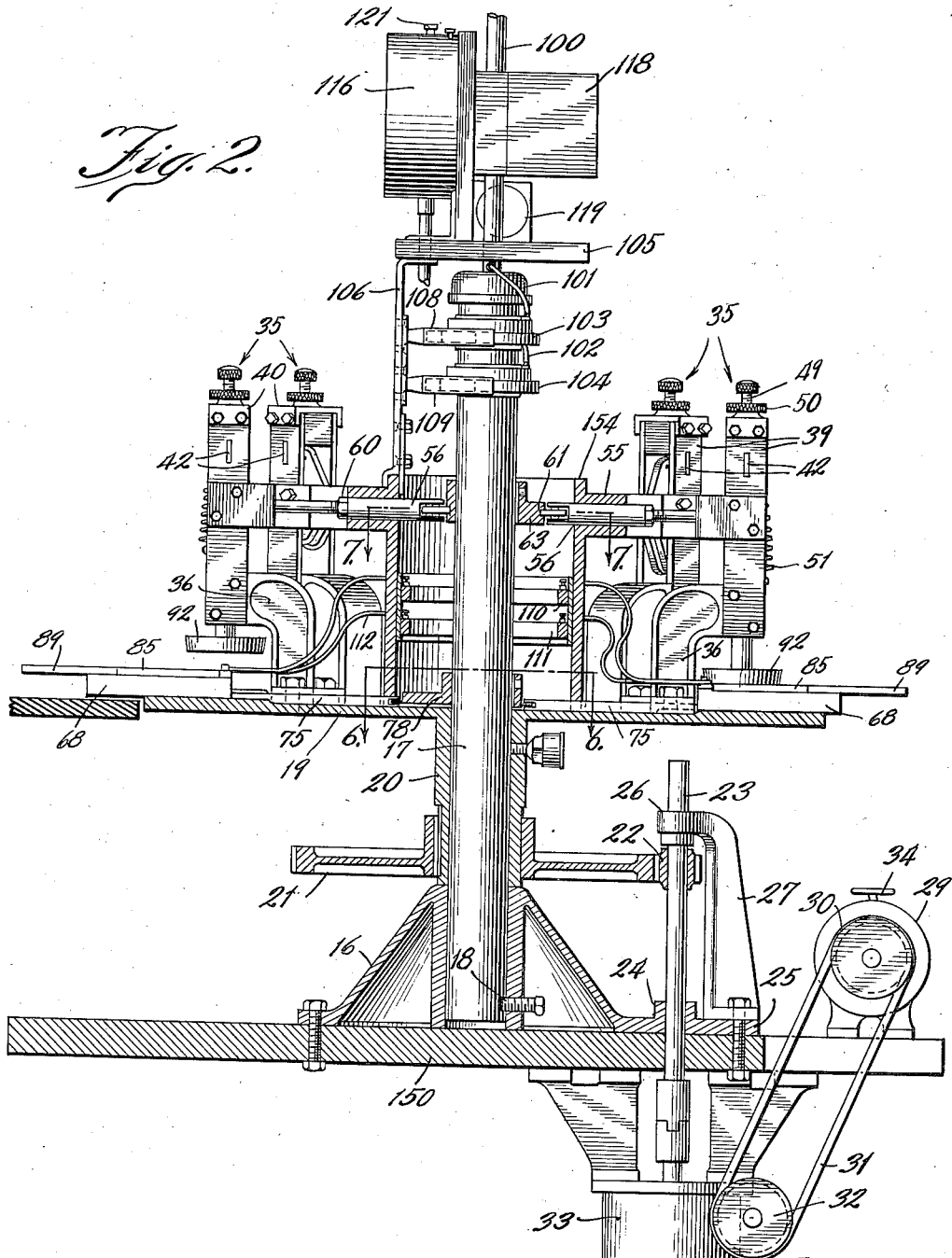
Fig. 2 is a vertical sectional view of the machine taken substantially on the line 2—2 of Fig. 1.

Fig. 8 is a diagrammatic representation of the electrical heating elements and temperature controls;

Fig. 9 is a perspective view of the end portion of a shoe tongue to which a patch is to be applied;

Fig. 10 is a similar view of the rubber blank that is to form the toe cap or patch on the shoe tongue;

Fig. 11 is a top view of the completed tongue;

Fig. 12 is a plan view of one of the shoe quarters showing an ankle patch applied thereon in accordance with my invention;

Fig. 13 is a similar view of a shoe quarter with ankle patch, lacing stay, saddle strip and foxing all applied in accordance with my invention;

Fig. 14 is a fragmentary sectional view, greatly enlarged, taken on the line 14—14 of Fig. 12;

Fig. 15 is an enlarged fragmentary sectional view on the line 15—15 of Fig. 3 showing the edge formation of the die recess.

As above indicated the material that we employ for our patches is a vulcanizable rubber compound which is preferably formed into sheets of proper thickness and then cut into blanks of a shape and size corresponding to the patch that is to be applied. The blank is then pressed by means of a suitable die against the portion of the fabric that is to be covered by the patch, the fabric being preferably supported at the time against a cushion surface, and the die having any desired configuration or design that is to be impressed in the rubber, and while the rubber blank and fabric are clamped between the die and the cushion surface, the parts are subjected to heat which softens the rubber so that it is forced by the pressure into a securely uniting relationship with the fabric and molded into the configuration or design of the die, the heat being continued for a sufficient length of time to vulcanize the rubber. Complete vulcanization is not necessary if the article is subsequently subjected to further vulcanization as in the case of athletic or sport shoes, but it is merely necessary to cure it sufficiently so that it will maintain its secure adhesion to the fabric and molded form throughout subsequent assembling operations and vulcanization of the assembled article. In fact there are some cases in which it is preferable to merely partially cure the rubber patch at the time of its application, as for example with toe caps and foxing strips of athletic or sport shoes, which are subsequently, in the assembling of the shoe, partially overlapped by other rubber parts that are vulcanized thereto in the curing of the complete shoe.

Any suitable press may be employed for securing the patches to the fabric and in some cases the patches may be applied to the completed article, although I have found it desirable to employ a machine such as shown herein having a series of automatically operated presses which are advanced successively from a loading position to a discharging position during a suitable period of time while subjected to a controlled heat which accomplishes the desired extent of vulcanization. I also prefer, particularly in the manufacture of athletic or sport shoes and similar articles, to apply the patches to the fabric parts before they are assembled in the shoe.

In the machine that I have disclosed to illustrate my invention the reference numeral 150 indicates the machine base which is provided with a socket member 16 in which the lower end of the shaft or axle 17 is secured by the set screw 18 so that this shaft is held in a vertical position. A circular table 19 is mounted to rotate on the shaft or axle 17, said table being provided with a hub 20 which extends downwardly around the shaft 17 to the socket member 16 and has a large gear 21 fixed on the lower end. A pinion 22 meshes with the gear 21, said pinion being secured to the shaft 23 which is journaled in an upright position in a lower bearing 24 formed in a lateral extension 25 of the socket member 16 and an upper bearing 26 at the top of a bracket 27 which is secured to the extension 25.

A motor 28 which is mounted on the base 150 is connected through a variable speed transmission 29 with a drive pulley 30 which is connected by a belt 31 with a pulley 32 of a suitable speed reducer 33 of any desired type which is mounted in any convenient manner at the lower end of and connected with the shaft 23 so that the table 19 is rotated around the shaft 17 at a relatively slow speed by the motor 28. The variable speed transmission 29 is of a well known type and has a member 34 that may be operated to change the speed ratio between the motor 28 and the pulley 30 to regulate the speed of rotation of the table 19 as may be required.

Small presses 35 of like construction are arranged in series at equal intervals around the peripheral portion of the table 19, each press 35 having an angular base or mounting bracket 36 which is secured to the table 19 at a distance inwardly from the table edge and each bracket 36 has an elevated outer end 37 with a vertical opening therethrough for the plunger 38 of the press. Each bracket member 36 has a pair of side bars or plates 39 secured at their lower ends to the opposite sides of the elevated end portion 37 of said bracket 38 and extending upwardly therefrom, the upper ends of each pair of side bars 39 being secured to a cap member 40. A block 41 is interposed between the bars 39 below the cap member 40 and this block has reduced ends engaged in slots 42 in the bars 39 so that said block is vertically movable, and this block 41 has a recess 43 in the under side to receive the upper end of a link 44 which is secured in said recess by a transverse pin 45. The lower end of this link 44 is secured by the pivot pin 46 between a pair of links 47, the lower ends of which embrace and are secured by the pin 48 to the flattened upper end of the plunger or stem 38, said links 44 and 47 thus forming a toggle mechanism for operating the plunger 38 of the press.

A threaded stem 49 which extends downwardly through the cap 40 engages against the top of and serves to regulate the elevation of the block 41, a lock nut 50 being provided on the stem 49 to hold it in adjusted positions. A spring 51 which is connected at its upper end to a cross pin 52 that extends between the bars 39 and at its lower end to a pin 53 that projects forwardly from the upper end of the plunger 38, serves to elevate the plunger 38 and this spring 51 acts in conjunction with a toggle push rod to hold the block 31 up against the lower end of the adjusting stem 49.

Figure 1:
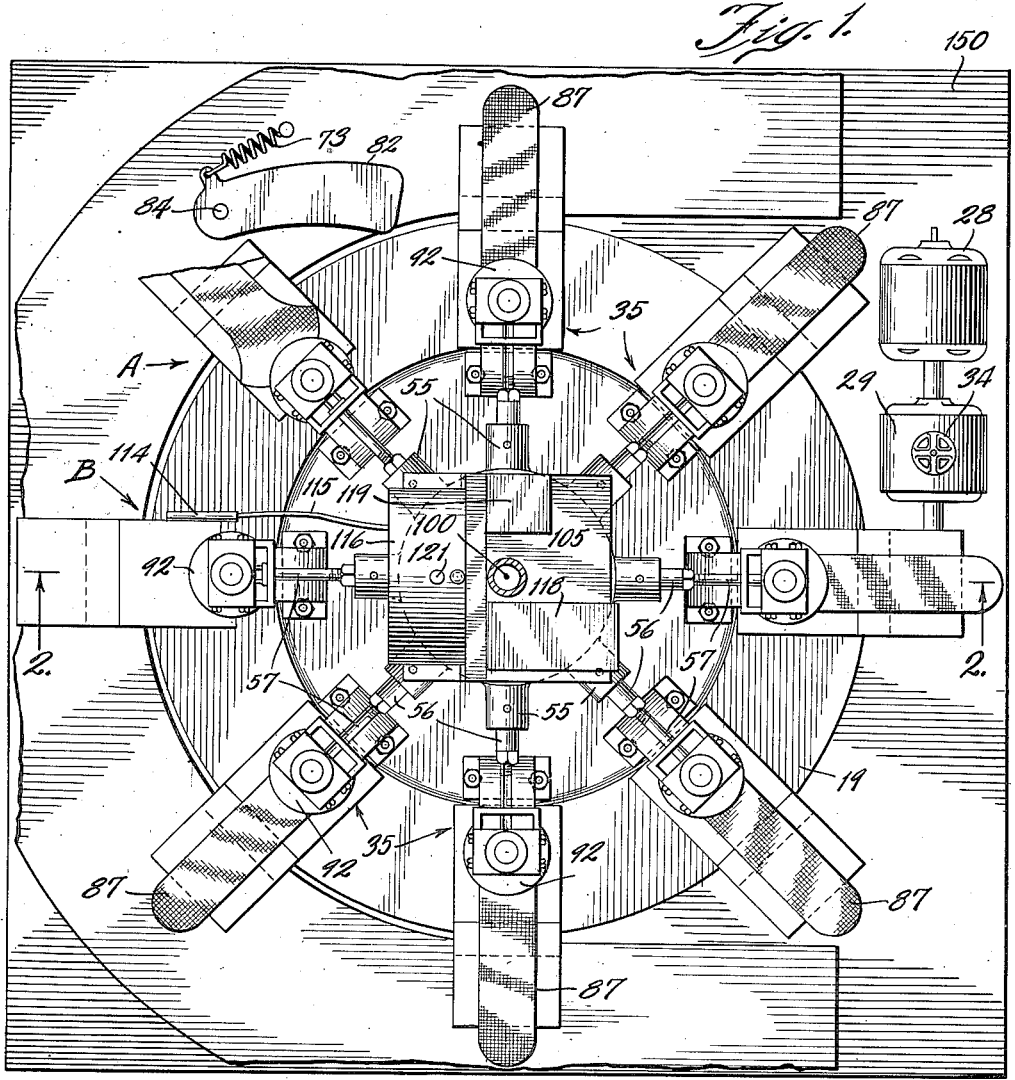
Fig. 1 is a top or plan view of a machine arranged to apply toe caps or patches to the tongues of athletic shoes.

In the operation of the present machine the presses, which rotate with the table 19 in the direction of the arrow 54 of Fig. 1, are open at the stations A and B to permit placing of the work in position to be operated upon and to permit removal of the work when the operation has been completed, the arrangement being such that as each press moves from the position A in the direction of the arrow 54 it is closed and remains closed until it nears the station B when it is opened and remains open until it passes the station A. To accomplish this operation of the presses as the table 19 rotates, a cylindrical shell or cam housing 154 is secured on the top of the table 19 so as to rotate therewith around the shaft 17 and this housing 154 is formed at the location of each press with a radial bearing 55 for a plunger 56 which has a push rod 57 extending outwardly therefrom and provided with a head 58 which engages against the middle of the respective toggle link mechanism 44—47 as shown in Fig. 5, the side bars 39 of each press 35 having a guide member 59 thereon through which the rod 57 extends and by which the headed end 58 of the rod is held in proper position to engage at the juncture of the links 44 and 48 of the toggle. The rod 57 is preferably threaded into the outer end of its plunger 56 and provided with a lock nut 60 to permit adjustment of said rod 57 for regulating the operation of the press.

Each plunger 56 has a roller 61 on the inner end engaging in a peripheral groove 62 of a cam 63 that is fixed on the upright shaft 17 and this cam is formed as shown in Fig. 7 with a low section 64 facing toward the stations A and B and serving as the presses 35 come around to these stations to permit the plungers 56 to retract toward the center of the machine, this retraction being effected by the springs 51 exerting a collapsing tension on their toggle mechanism, by reason of which pressure is exerted by the toggle mechanism on the headed end 58 of each push rod 57 to force its plunger 56 inwardly.

Beyond the station A, the cam 63 has a rise 65 to a radial elevation 66 which continues, except as hereinafter noted, around to the decline 67 which is located at a point preceding the location of the station B so that each plunger 56 retracts and its press is opened before the press reaches the station B. The rise 65 of the cam serves to close the presses as they come opposite the location of said rise and the elevated portion 66 holds the presses closed during the time that they are passing around to the position opposite the decline 67.

Under each press is a slide 68 which is mounted in a radial recess 69 of the table 19 to move outwardly from a position under the press, said slide being provided along one edge with a channel or groove 70, and a clip 71 which is secured by screws 72 onto the top of the table 19 at the corresponding side of the respective recess 69 has the end projecting into the groove 70 to hold the slide 68 in its recess 69. A radially extending bar 75 is provided at each press and extends through the respective bracket 36 and butts endwise against the inner end of the respective slide 68, the remote end of said bar being passed through an opening 76 at the lower end of the cam housing 154, and at the inner end of each bar 75 is a roller 77 which is adapted to engage with a cam 78 that is secured to the upright shaft 17. This cam 78 has a radial offset 79 opposite the stations A and B with a somewhat gradual slope 80 which forces each bar 75 outwardly just after the decline 67 of the other cam 63 has been passed and the press opened and just before the press reaches the station B where, in the present apparatus, the completed work is removed and a rubber patch placed in the mold or die for the next operation. By this arrangement of the cam 78, each slide 68 with the work thereon is moved outwardly from under its respective press, as the latter nears the station B, so as to facilitate removal of the work and placing of another rubber blank in the die and the slide remains in this position until after it passes the station A where, in the present apparatus, the operator places over the die and rubber blank the fabric part to which the rubber patch is to be attached.

Just after the press moves beyond the station A the slide 68 is moved inwardly to position the work under the press, and this inward movement may be accomplished in various ways. Preferably the cam 79 is provided with an abrupt drop off 81 just beyond the location of the station A and a spring pressed lever or wiper 82 is arranged to engage the outer end of each slide 68 just after it passes the drop off 81 and push the slide back to the limit of its inward movement under its respective press 35. For convenience a stationary shelf 83 is mounted along the periphery of the table 19 and the lever or wiper 82, which is preferably of wood to minimize wearing effect, may be pivoted on this shelf as at 84 and have a spring 73 connected therewith to resiliently hold the lever 82 in position to deflect the slides inwardly as they pass thereby.

Each slide 68 has a die block 85 secured to the top face in any convenient manner, this die block being removable to adapt the machine for application of other patches or rubber blanks, the illustrated die being of a form to secure toe caps 86 to sport shoe tongues, as shown in Fig. 11, before the said tongue is assembled in the shoe, said die being in the form of a shallow recess 88 with a knurled bottom for forming a corresponding design on the toe cap or patch 86 as the latter is attached to the tongue 87.

Each slide 68 may also have an extension 89 attached thereto if desired or necessary to assist in supporting the part to which the rubber patch is to be applied, this extension 89 in the present case being merely a radial continuation of the die block 85 and serving to support the outer portion of the shoe tongue 87, as shown in Fig. 1, while the patch 86 is applied to the inner end thereof.

The plunger or stem 38 of each press also has a foot that is removable so as to adapt the press for the different forms of die recesses in the die plates 85 that may be employed and to this end the lower end of the plunger or stem 38 is provided with socket 90 to receive the attaching stem or shank 91 of the particular foot 92 which in the present case is of suitable form and size to cooperate with the die recess 88. The presser foot is designed to provide a cushioned pressure against the work on the die plate 85 and accordingly is formed in the under side with a cavity 192 in which is an insert 93 of cushioning material, preferably a dense sponge rubber with a felt facing 94, said insert being readily removable for replacement whenever required.

Directly under the die plates 85 each slide 68 is provided with an electrical heating element 95 the under side of the slide 68 being recessed at 96 to accommodate said element, and the terminals of each heating element lead to binding posts 97 and 98 on an insulating strip 99 at the rear end of the respective slide.

For supplying current to the heating elements 95 a conduit 100 leads to the upper end of the stationary shaft or axle 17 around which the table 19 rotates and this conduit contains a pair of feed wires 101 and 102 which are connected respectively with the rings 103 and 104 that are mounted in an insulated manner near the upper end of the shaft or axle 17.

A support 105 is mounted above the upper end of the shaft 17 and has the conduit 100 extending freely therethrough, said support 105 being secured by one or more brackets 106 onto the cam housing 54 so as to rotate with said housing and the table 19 to which it is attached and this support 105 has mounted thereon thermostatically controlled devices for regulating the supply of electric current to the heating elements 95.

Mounted on the bracket 105 in an insulated manner are a pair of brushes 108 and 109 which are maintained in contact respectively with the rings 103 and 104, and mounted in an insulated manner within the cam housing 54 are a pair of ring shaped conductors 110 and 111 one of which, for example the conductor 110, is connected with the brush 109. The other brush 108 is connected through the thermostatic control devices on the support 105 with the ring conductor 111 and each heating element 95 has its terminals 97 and 98 connected by the conductors 112 and 113 respectively with the rings 110 and 111 so that all of the heating elements 95 are connected in parallel with the supply wires 101 and 102 and the current supply to all of these heating elements is uniformly and simultaneously controlled by the thermostatic control devices. The heating elements 95 are all alike and will accordingly be heated to the same temperature and because of this the supply of current to all the heating elements may be satisfactorily controlled by a heat responsive element at any one of the heating elements.

Any desired heat responsive control for the current supply may be employed, that shown herein being of a well known type comprising a bulb 114 that is welded onto the side of one of the slides 68 and connected by a flexible tube 115 with a thermostat 116 which comprises an element that expands and contracts in accordance with changes of temperature to which the bulb 114 is subjected.

In the present case alternating current is supplied through the feed wires 101 and 102 and a switch 117 is controlled by the thermostat 116 for regulating the supply of current to the heating elements 95, the said switch 117 being operated by a relay 118 which is preferably energized by a current of lower voltage than that of the feed wires 101—102, the supply of the lower voltage current being controlled by the expansion member 116. Accordingly a transformer 119 is provided, the primary circuit of which is connected with the supply conductors 101—102 and the output terminals of the secondary winding of this transformer are connected with the relay 118 through a switch 120 that is controlled by the expansion member 116, the control device being provided with the usual adjusting means 121 whereby the operation of the switch 117 may be made to occur at a selected temperature of the bulb 114 and the temperature of the heating elements 95 thereby regulated.

The present apparatus is shown as adapted to apply toe caps or patches 86 to fabric blanks 87 that are subsequently assembled into shoes and for this operation is provided with the die plate 85 having a shallow recess 88 with a knurled bottom for molding the toe cap onto the shoe tongue, and the slide 68 has the extension 89 for supporting the outer portion of the tongue. In applying the patch a sheet rubber blank 122 of suitable size to fit in the mold cavity 88 and of suitable thickness to form the toe cap or patch 86 is placed in the die cavity 88 after which the shoe tongue blank 87 which is in the form shown in Fig. 9 is placed with the enlarged end over the rubber blank 122 in the mold cavity 88. Obviously in order to insure application of the patch at the proper location on the tongue blank 87 it is desirable to provide facilities for accurately locating the tongue blank 87 over the mold cavity 88 in which the rubber blank 122 has been placed. Various means may be provided for this purpose as for example pins 123 on the die plate 85 which engage openings that are provided in the blank 87 to receive these pins, these openings in the present blank being merely short crossed slits 124 which open up to admit the pins 123.

While it is, of course unnecessary to follow my particular procedure, I have found it desirable to have an operator at the station A and another operator at the station B. At both of these stations the press is opened and the slide 68 is located outwardly from under the press and as each press comes around to the station B the operator at that place removes the completed work and places a rubber blank 122 in the mold cavity 88. Then as the press moves on to the station A the operator at that place applies the fabric shoe tongue blank 87 in position on the die plate 85 and extension 89 with the slitted openings 124 fitted on the pins 123 and immediately after this occurs the slide 68 comes in contact with the wiper lever 82 which moves the slide back under its press. Immediately thereafter the roller 61 of the operating plunger 56 of that particular press comes in contact with the rise 65 of the cam 66 which forces the middle of the toggle 44—47 of the press outwardly and closes the cushioned face of the press foot 92 down against the portion of the tongue 87 that is above the mold cavity 88. The die plate 85 is maintained at a suitable temperature to soften the rubber and vulcanize same to the desired extent in the passage of the press from the closed position just beyond the station A to the open position at the station B and when the press closes just beyond the station A the heat and pressure molds the rubber into the shape and design of the mold cavity 88 and forces the softened rubber into the interstices of the blank 87 and effects a permanent and secure attaching relationship of the rubber with the fabric which is preserved thereafter by the vulcanization or partial vulcanization of the rubber that occurs during the time, which may be regulated by the variable transmission 29, during which the press passes from the loading position at station A to station B where the operator removes the combined tongue 87 and patch 86.

In this operation of applying the patch to the fabric there is a tendency of air to pocket in the mold cavity 88 and it is important that this trapped air should be permitted to escape. This, I have found, may be accomplished by releasing the pressure of the press shortly after the initial pressure has been applied and I accordingly form the raised portion 66 of the cam 63 with a shallow depression 125 at a distance beyond the rise 65, this depression being sufficient to permit the toggle spring 51 to lift the presser foot 92 sufficiently to permit the trapped air to escape.

In applying rubber pieces or patches in the manner contemplated herein it is important to confine the rubber within the die cavity so that when the rubber is heated and softened and subjected to pressure it will not extrude outwardly around the edges of the die cavity. This is accomplished by forming the die, as shown in Fig. 15, so that the die cavity is surrounded by a raised edge 155 at a sufficient elevation above the face of the die to press the fabric against or into the face of the presser foot pad or cushion 93 and provide a marginal seal around the die recess which effectively retains the rubber within the die cavity. Moreover, it is important that upon completion of the application of the rubber to the fabric the rubber should be free to be removed from the die without sticking and in order to prevent sticking to the die, the rubber, either before or after being cut into the required blanks, is coated with a material such as zinc stearate which has the property of preventing adherence of the rubber to the die.

Various other forms of patches may be applied to fabrics or other similar materials in accordance with my invention and the illustrated machine is adaptable to apply patches of these other forms merely by changing the die plate 85 and presser foot 92 and providing other supports as may be needed in place of the support or extension 89. For example, the shoe sides or quarters may in like manner be provided with ankle patches 126 which may have any desired design impressed thereon and may also have stitch markings 127 impressed thereon so that they will simulate the appearance of the ankle patches that have previously been stitched onto the shoe sides or quarters. In some cases and particularly in the case of patches at the ankle or in other places where they are likely to be exposed to scuffing or some action that would have a tendency to pull them loose from the fabric, it is deirable to avoid abrupt edges and the die is accordingly formed to press the marginal portions of the patch down in the form of a feather edge as shown at 128 in Fig. 14.

Other patches may also be applied in like manner as for example lacing stays 129 of Fig. 13, foxing strips 130 and saddle strips 131, any of which may of course be employed alone if desired or in combination with other strips or patches and all of which together with the ankle patch may be attached to the fabric in the same operation.

In the case of the athletic or sport shoe it is customary to vulcanize the structure after the parts have been assembled into the completed shoe and it is accordingly unnecessary, in the application of the patches to the various shoe parts, to vulcanize these patches except to an extent to set the rubber sufficiently so that it will maintain its form and remain securely attached throughout the further operations of completing the shoe. In some cases however, the rubber may be completely vulcanized in the press.

While I have shown and described my invention in a preferred form, I am aware that various changes and modifications may be made therein without departing from the principles of my invention, the scope of which is to be determined by the appended claims.

I claim as my invention:

1. In an apparatus of the class described the combination of a center member, a plurality of presses movable consecutively around said member each press having a work support movable radially to and from the press position and a pair of cams on the center member arranged to control the opening and closing of the presses and the movements of the work support in predetermined positions in their rotation around the center member.

2. In an apparatus of the class described, the combination of a plurality of presses which are movable consecutively past a predetermined position, means operable automatically to open and close each press in the movement thereof respective to and from said position, and each press including a work support which is movable to and from the press position when the respective press is open and at said predetermined position.

3. In an apparatus of the class described, the combination of a plurality of presses which are movable consecutively past a predetermined position, means operable automatically to open and close each press in the movement thereof respectively to and from said position, each press including opposed members one of which said members is movable to and from the other of said members to compress material therebetween and said other member being movable laterally to and from the path of movement of the first mentioned member.

RAY R. HUNT.